(12) United States Patent
Sato et al.

(10) Patent No.: US 6,359,849 B1
(45) Date of Patent: Mar. 19, 2002

(54) SIGNAL PROCESSING APPARATUS, RECORDING MEDIUM, AND SIGNAL PROCESSING METHOD

(75) Inventors: Hideo Sato; Yuuki Matsumura, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/365,945

(22) Filed: Aug. 2, 1999

(30) Foreign Application Priority Data

Aug. 3, 1998 (JP) ........................................... 10-218782

(51) Int. Cl.[7] ................................................. G11B 7/00
(52) U.S. Cl. ..................... 369/59.1; 369/59.13; 386/112
(58) Field of Search ............................. 369/47.1, 47.11, 369/53.1, 53.41, 59.1, 59.13, 59.23, 59.24, 59.25, 124.01, 124.06; 386/112, 120, 109, 111

(56) References Cited

U.S. PATENT DOCUMENTS 5,047,852 A * 9/1991 Hanyu et al. ............ 386/112 X
5,845,041 A * 12/1998 Ohkuma et al. ............... 386/68
6,175,685 B1 * 1/2001 Tauchi et al. ................ 386/112

* cited by examiner

*Primary Examiner*—Muhammad Edun
(74) *Attorney, Agent, or Firm*—Frommer Lawrence & Haug LLP; William S. Frommer; Bruno Polito (57) ABSTRACT

A signal processing apparatus, a recording medium, and a signal processing method that can be applied to, for example, an optical disk apparatus for recording audio signals in an optical disk, the optical disk, and an optical disk apparatus for reproducing data from the optical disk inhibit deterioration in quality of input signals and enable superimposition of copyright data or the like in such a manner that it is difficult to analyze. An input signal is subjected to orthogonal transform processing to generate coefficient data. Input data is embedded in the coefficient data, then the result is subjected to inverse orthogonal transform processing.

26 Claims, 6 Drawing Sheets

SIGNAL PROCESSING APPARATUS, RECORDING MEDIUM, AND SIGNAL PROCESSING METHOD

BACKGROUND OF THE INVENTION

1. Field of the Invention

The present invention relates to a signal processing apparatus, a recording medium, and a signal processing method which can be applied to, for example, an optical disk apparatus for recording audio signals in an optical disk, the optical disk, and an optical disk apparatus for reproducing data from the optical disk. The present invention embeds input data in coefficient data, which is obtained by subjecting input signals to orthogonal transform processing, and performs inverse orthogonal transform processing on the result, thus making it possible to prevent the quality of input signals from deteriorating and to superimpose copyright data or the like in such a manner that it will be difficult to be analyzed.

2. Description of the Related Art

Hitherto, a method has been proposed whereby to protect copyrights by the so-called watermarks in recording media such as optical disks. According to this method, modulated signals or the like of data regarding copyrights that are sufficiently low so as not to affect reproduction of audio signals or the like are superimposed on the audio signals or the like.

Superimposing data related to copyrights as set forth above, however, inevitably deteriorates the quality of audio signals or the like accordingly. Especially in the case of audio signals, the deterioration in quality caused by superimposing such a type of data is worse than in the case of video signals.

There has been proposed another method whereby data related to copyright is superimposed by operating PCM audio data directly using this type of data. This method, however, is disadvantageous in that the data is relatively easily analyzed.

Due to the shortcomings described above, this type of watermarks has been unsatisfactory in practical use for protecting copyrights.

SUMMARY OF THE INVENTION

Accordingly, the present invention has been made with a view toward solving the difficulties described above, and it is an object thereof to propose a signal processing apparatus and a signal processing method that make it possible to prevent the quality of input signals from deteriorating and to superimpose copyright data or the like in such a manner that it will be difficult to be analyzed. Another object of the invention is to propose a recording medium wherein input signals processed by the foregoing signal processing apparatus and method have been recorded.

To these ends, according to one aspect of the present invention, there are provided a signal processing apparatus and a signal processing method wherein input signals undergo orthogonal transform processing to generate coefficient data, and input data is embedded in the coefficient data which is then subjected to inverse orthogonal transform processing before it is output.

According to another aspect of the present invention, there is provided a recording medium wherein input signals are recorded. The input signals are subjected to orthogonal transform processing to generate coefficient data, and input data is embedded in the coefficient data and subjected to inverse orthogonal transform processing so as to convert it back into the original input signals, which are then recorded in the recording medium.

Furthermore, in the signal processing apparatus and the signal processing method, input signals undergo orthogonal transform processing to generate coefficient data, and data embedded in the input signals is reproduced from the coefficient data.

In the signal processing apparatus and the signal processing method, input signals undergo orthogonal transform processing to generate coefficient data, and input data is embedded in the coefficient data and subjected to inverse orthogonal transform processing. This enables deterioration in quality to be hardly recognizable in comparison with a case where input data is embedded directly in input signals, and also permits input data to be embedded such that it will be difficult to find.

By recording the input signals that have been processed as set forth above in a recording medium, it is possible to record, for example, audio signals with controlled deterioration in sound quality and in such a fashion that copyright data or the like is difficult to find.

Furthermore, in the signal processing apparatus and the signal processing method, input signals undergo orthogonal transform processing to generate coefficient data, and data embedded in the input signals is reproduced from the coefficient data. This enables the data embedded in the input signals to be detected.

DESCRIPTION OF THE PREFERRED EMBODIMENTS

An embodiment of the present invention will now be described with reference to the accompanying drawings.

Figure 2:
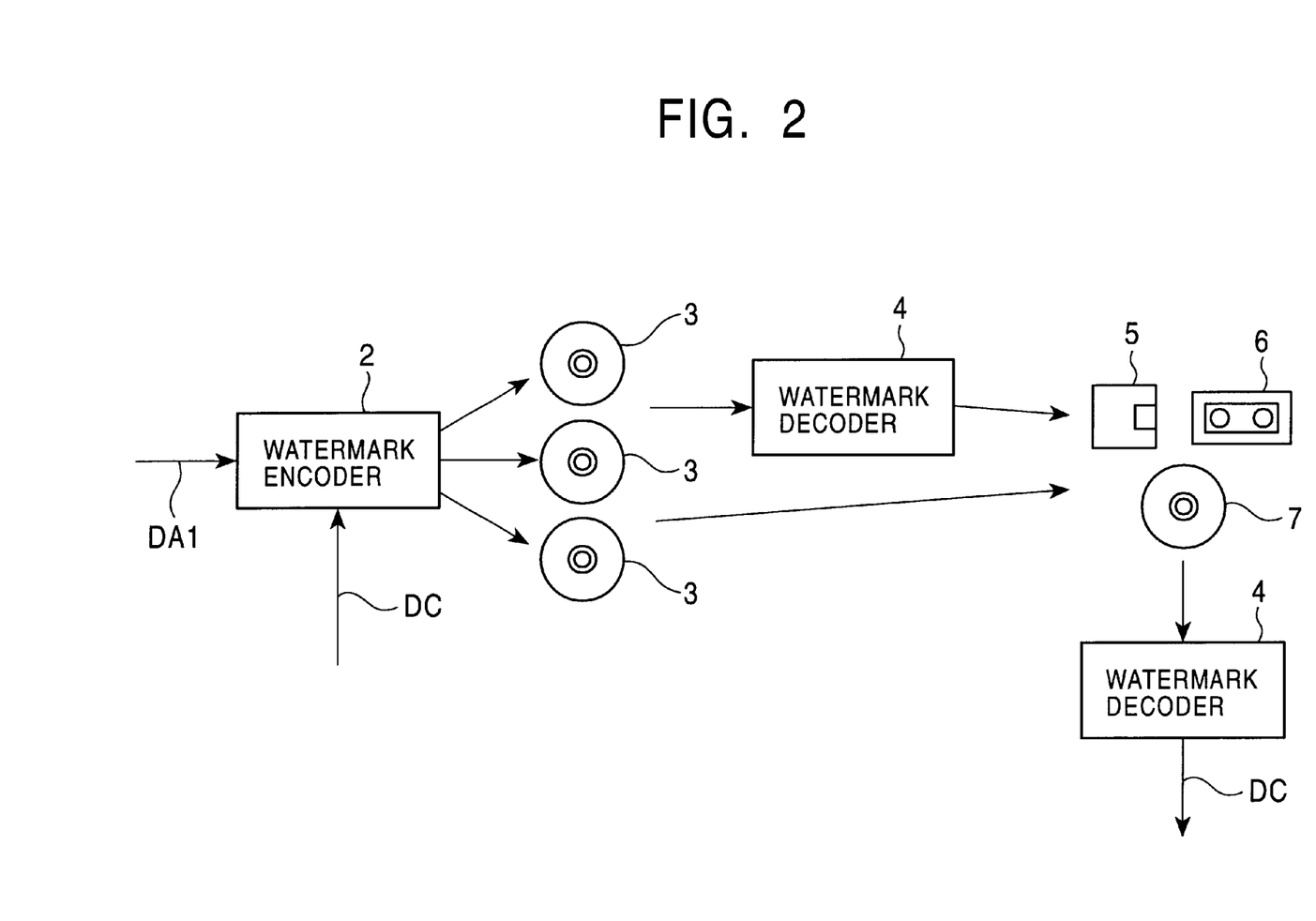
FIG. 2 is a schematic representation illustrating a system for processing an illegal copy to which the watermark encoder of FIG. 1 has been applied.

FIG. 2 is a block diagram showing an entire system for detecting an illegal copy in accordance with the embodiment of the present invention. In this embodiment, when recording a digital audio signal DA1, which is an audio source, copyright information DC is added thereto by a watermark encoder 2 before it is recorded in an optical disk 3. The copyright information DC is formed of pieces of information regarding an owner of the copyright, whether or not copying is permitted, etc.

Further in this system, when dubbing the optical disk 3, the copyright information DC is detected by a watermark decoder 4 to permit copying of only a source, which has been permitted to be copied, into a magneto-optical disk 5, a digital audio tape recorder 6, a CD-R 7, etc. In media into which the source has been copied and which are distributed in a market, the copyright information DC is detected from reproduced digital audio signals by the watermark decoder 4 thereby to find illegal copies.

Figure 1:
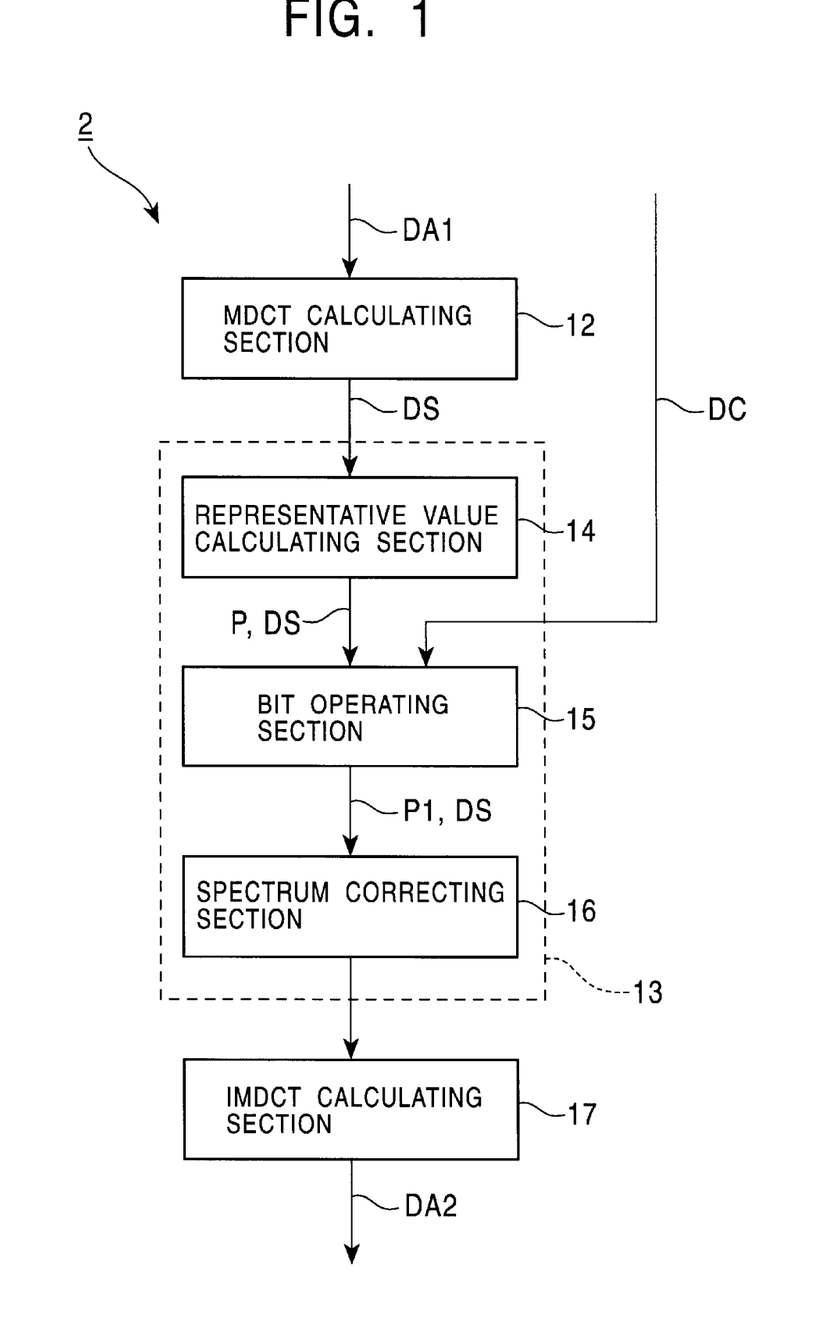
FIG. 1 is a block diagram showing a watermark encoder in accordance with an embodiment of the present invention.

FIG. 1 is a block diagram showing the watermark encoder 2. In the watermark encoder 2, a modified discrete cosine transform (MDCT) calculating section 12 carries out MDCT processing, which is one type of orthogonal transform processing, on the digital audio signal DA1 that is received one after another, thereby converting the digital audio signal DA1 into a frequency spectrum signal DS. The frequency spectrum signal DS is a set of coefficient data obtained by applying the MDCT processing to the digital audio signal DA1; it indicates a signal level of each frequency spectral line obtained by the MDCT processing.

An encoding section 13 embeds the copyright information DC in the frequency spectrum signal DS and outputs the result. More specifically, in the encoding section 13, a representative value calculating section 14 reads the frequency spectrum signal DS which has been calculated by the MDCT calculating section 12 on a sample block basis. The representative value calculating section 14 further checks each sample block for a representative value P of a predetermined frequency. The representative value P indicates a signal level of the predetermined frequency in the digital audio signal DA1.

Thus, calculation results obtained from the MDCT show spectral values that vary according to phases of input signals. Studying the changes in two adjacent spectral values, i.e. the spectral values obtained from the MDCT, has revealed that the spectral values change on a basis of trigonometric function according to the phase of an input signal, the phase being shifted by $\pi/2$. In other words, it has been found that the root mean square (RMS) values of the two spectral lines remain constant irrespectively of the phases.

Furthermore, the MDCT calculation results indicate that, if an input signal has a single sine wave, then spectrum energy is concentrated mostly on four spectral lines around a peak which corresponds to a theoretical value even when a phase is changed. It has been discovered that the spectral lines on which the energy is concentrated are a target frequency spectral line $spec_i$, a frequency spectral line $spec_{i-1}$ immediately preceding the target frequency spectral line, and two spectral lines $spec_{i+1}$ and $spec_{i+2}$ immediately following the target frequency spectral line.

Thus, in this embodiment, the representative value calculating section 14 sets a frequency of 3 kHz at the predetermined frequency, and denotes the frequency spectral line of the 3-kHz frequency as $spec_i$, a frequency spectral line immediately preceding the target frequency spectral line as $spec_{i-1}$, and two spectral lines immediately following the target frequency spectral line as $spec_{i+1}$ and $spec_{i+2}$ to execute arithmetic processing in accordance with an expression given below. Then, the representative value calculating section 14 adds the squared sum of absolute spectral values of even-numbered ordinal positions and the squared sum of the absolute spectral values of odd-numbered ordinal positions, and calculates a square root of the value obtained by the addition thereby to obtain the representative value P of the target frequency spectrum.

$$P = SQRT((|spec_{i-1}| + |spec_{i+1}|)^2 + (|spec_i| + |spec_{i+2}|)^2) \quad \text{Expression (1)}$$

The representative value calculating section 14 supplies the representative value P calculated as mentioned above and a frequency spectrum signal to a following bit operating section 15.

The bit operating section 15 determines whether the representative value P obtained for each sample block is a value $2^n$ or more, and if the representative value P is $2^n$ or more, then it embeds the copyright data DC in the representative value P. The bit operating section 15 circulatively repeats the copyright data DC in a serial data format to embed the copyright data DC on a 1-bit basis in sample blocks having representative values P of $2^n$ or more.

Figure 3A:
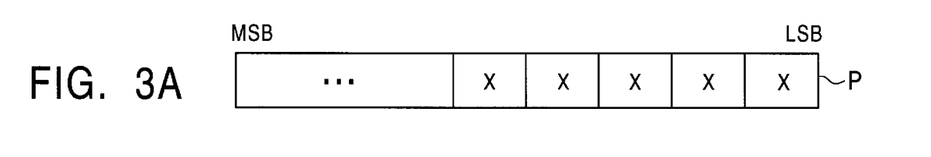
FIGS. 3A to 3E is a schematic representation for explaining processing of a bit operating section of the watermark encoder of FIG. 1.
Figures 3B, 3C:
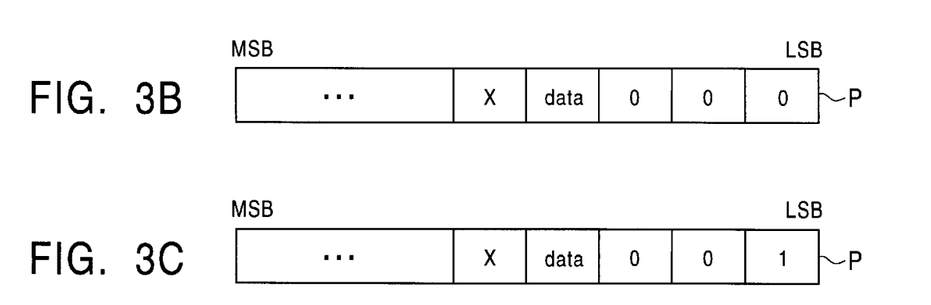

As shown in FIGS. 3A to 3E, in the embedding operation, for the data of the representative value P formed of a series of predetermined logical values as shown in FIG. 3A, the bit operating section 15 sets a fourth bit on the higher order side from the least significant bit as a logical value data corresponding to a polarity of input data DC as shown in FIG. 3B. As the bit for setting the logical level is closer to the least significant bit, the deterioration in sound quality can be controlled further, while on the other hand, the resistance to an attack decreases. For this reason, the bit for setting the logical level is appropriately selected. In this embodiment, the processing for the bit operation will be selectively implemented on sample blocks having the representative values P of $2^n$ or more in order to control deterioration in sound quality to be the least perceivable.

The watermark encoder 2 corrects the frequency spectral value supplied for calculating the representative value P on the basis of the bit-operated representative value P mentioned above, then subjects the corrected value to inverse MDCT processing thereby to embed the copyright data DC.

The bit operating section 15 sets offset values in bits following the logical value setting bit to make it possible to properly reproduce the logical value in the bit, in which the logical value has been set, even if a quantization error is involved when reproducing the copyright data DC by processing the audio signal in which the copyright data DC has been embedded.

Figure 3D:
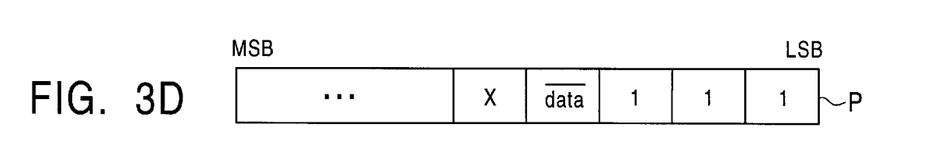
Figure 3E:
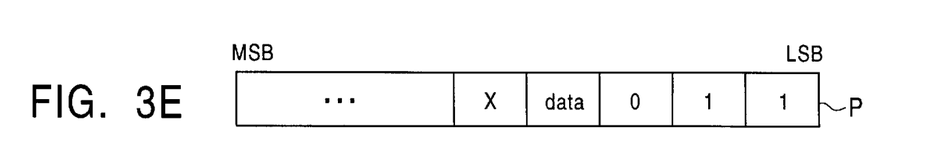

More specifically, the quantization error can be studied, for example, by carrying out add-subtract processing on the least significant bit. For instance, if the bits from the fourth bit to the least significant bit are set to a logical value 0 as shown in FIG. 3B, then no change will be observed in the logical value data when a value 1 is added to the least significant bit as shown in FIG. 3C. However, when the value 1 is subtracted from the least significant bit as shown in FIG. 3D, a change in the logical value data will be observed.

Therefore, the bit operating section 15 sets the logical values of the bits of lower order than the logical value data bit so that the logical value data is not changed when addition or subtraction is implemented at least on the least significant bit. This makes it possible to properly detect the copyright data DC even when the representative value P cannot properly be reproduced due to a quantization error (see FIG. 3E).

The bit operating section 15 supplies correction data P1 of the representative value P, which has been obtained by operating the bits, together with the frequency spectrum signal DS to a spectrum correcting section 16.

The spectrum correcting section 16 corrects the frequency spectrum value that has undergone the calculation of the representative value P on the basis of the bit-operated representative value P as mentioned above. The spectrum correcting section 16 executes the arithmetic processing in accordance with an expression given below thereby to proportionately distribute the changes of the representative value P based on the bit operation according to individual spectral values spec.

$$spec_j = spec_j \times (spec'/spec) \quad (i-1 \leq j \leq i+2) \quad \text{Expression (2)}$$

where spec denotes the representative value P prior to the bit operation, and spec' denotes the representative value P after the bit operation.

Thus, the watermark encoder 2 embeds the input data DC in the frequency spectral data so that a predetermined bit provides a logical value data corresponding to the logical value of the input data DC in the representative value P which is the squared sum of plural spectral values in the vicinity of a predetermined spectral line in a frequency spectrum signal.

At this time, the watermark encoder 2 sets the predetermined bit of the representative value P to a logical value data corresponding to the logical value of the input data DC so as to scatter data in a narrow frequency band near the predetermined frequency spectral line when embedding the input data DC.

An inverse MDCT (IMDCT) calculating section 17 carries out inverse MDCT calculation on the frequency spectral data obtained as set forth above thereby to output a digital audio signal DA2 in the same format as that of the original digital audio signal DA1.

Figure 4:
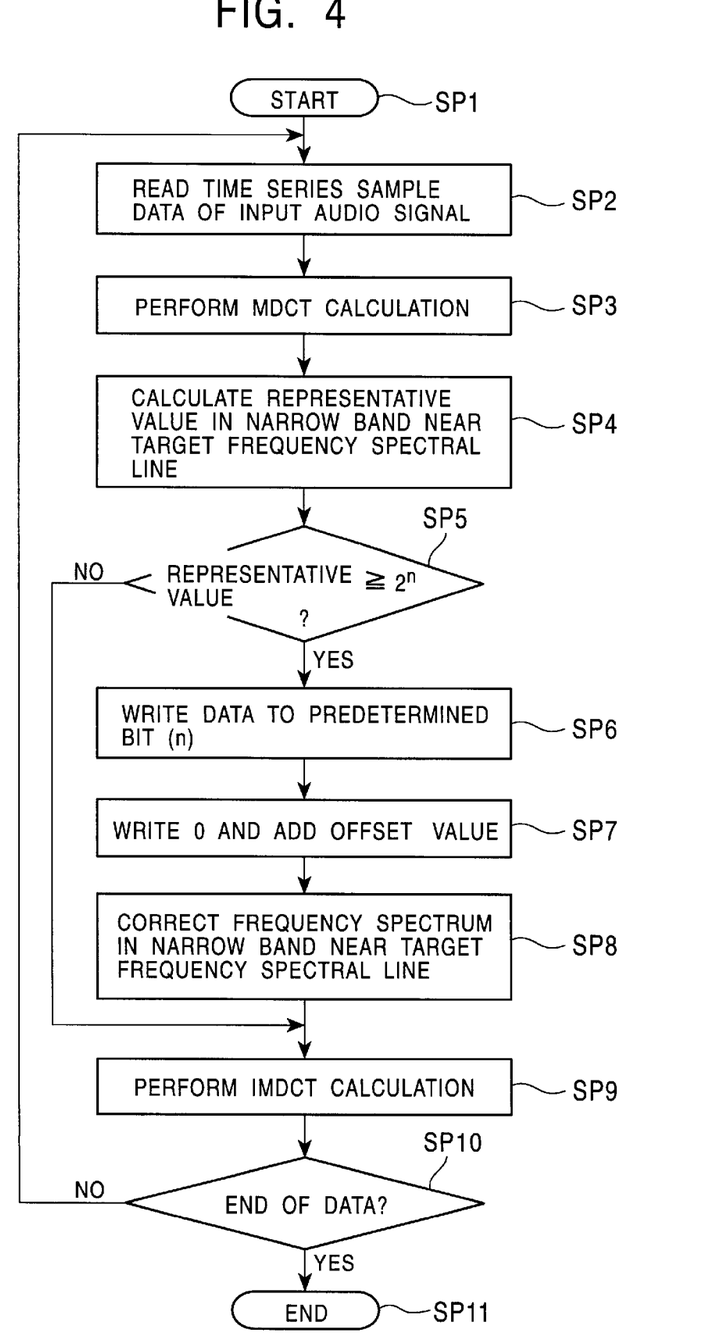
FIG. 4 is a flow chart for explaining processing of the watermark encoder of FIG. 1.

FIG. 4 is a flow chart showing a processing procedure of the watermark encoder 2 that processes the digital audio signal DA1 as set forth above. The watermark encoder 2 proceeds from step SP1 to step SP2 wherein it reads the digital audio signal DA1. The watermark encoder 2 then advances to step SP3 wherein it implements the MDCT calculation to obtain a frequency spectrum signal.

Subsequently, the watermark encoder 2 proceeds to step SP4 to calculate the representative value P, and determines in step SP5 whether the representative value P is a predetermined value or more. If the determination result is affirmative, then the watermark encoder 2 proceeds to step SP6 wherein it sets a predetermined bit of the representative value P to a logical value based on the copyright data DC.

In step SP7, the watermark encoder 2 sets the logical values of the bits lower-order than the bit, wherein the copyright data DC has been set, to the logical value 0, and further adds a predetermined offset value thereby to enable the copyright data DC to be properly detected despite a quantization error.

Next, the watermark encoder 2 proceeds to step SP8 wherein it corrects the frequency spectral value that has been supplied for detecting the representative value P, and it reproduces in the following step SP9 the original digital audio signal from the frequency spectrum signal that has been corrected as mentioned above. If the representative value P is smaller than the predetermined value, then the watermark encoder 2 skips the processing from step SP6 to step SP8; instead, it proceeds from step SP5 directly to step SP9 wherein it reproduces the original digital audio signal.

After reproducing the original digital audio signal as mentioned above, the watermark encoder 2 advances to step SP10 wherein it determines whether the processing of the digital audio signal DA1 has been completed, and if the determination result is negative, then it returns to step SP2. Thus, the watermark encoder 2 repeats the processing procedure for individual sample blocks in succession, allocates the copyright data DC to the predetermined bits of the representative values P in the sample blocks wherein the representative values P of the predetermined values or more are obtained, and processes the digital audio signal DA1. If an affirmative determination result is given in step SP10, then the watermark encoder 2 advances from step SP10 to step SP11 wherein it terminates the processing procedure.

Figure 5:
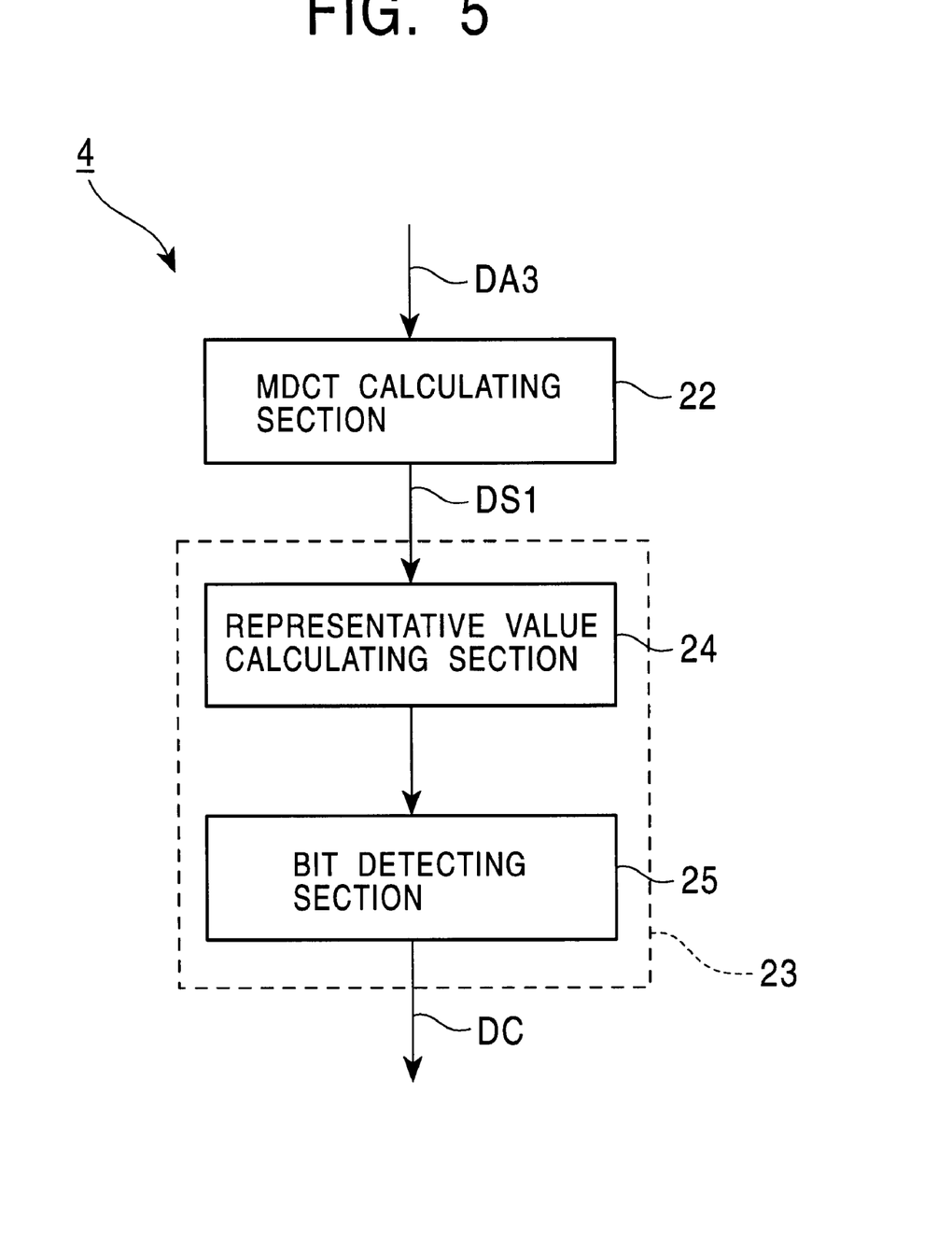
FIG. 5 is a block diagram showing a watermark decoder of FIG. 2.

FIG. 5 is a block diagram showing a watermark decoder 4. The watermark decoder 4 detects the copyright data DC from a digital audio signal DA3. More specifically, in the watermark decoder 4, an MDCT calculating section 22 applies the MDCT processing to the digital audio signals DA3 entered in sequence thereby to convert the digital audio signals DA3 into frequency spectrum signals DS1.

A decoding section 23 detects the copyright data DC from the frequency spectrum signal DS1. To be more specific, in the decoding section 23, a representative value calculating section 24 reads the frequency spectrum signal DS1, which has been calculated by the MDCT calculating section 22, from each sample block. Furthermore, the representative value calculating section 24 implements the arithmetic processing based on expression (1) so as to detect the representative value P of a predetermined frequency for each sample block.

If the representative value P is a value or greater that corresponds to a predetermined value judged in the encoding section 13, then a bit detecting section 25 selectively captures a predetermined bit of the representative value P. The bit detecting section 25 outputs, as the copyright data DC, the data formed of a string of bits captured from the sample blocks in succession.

Figure 6:
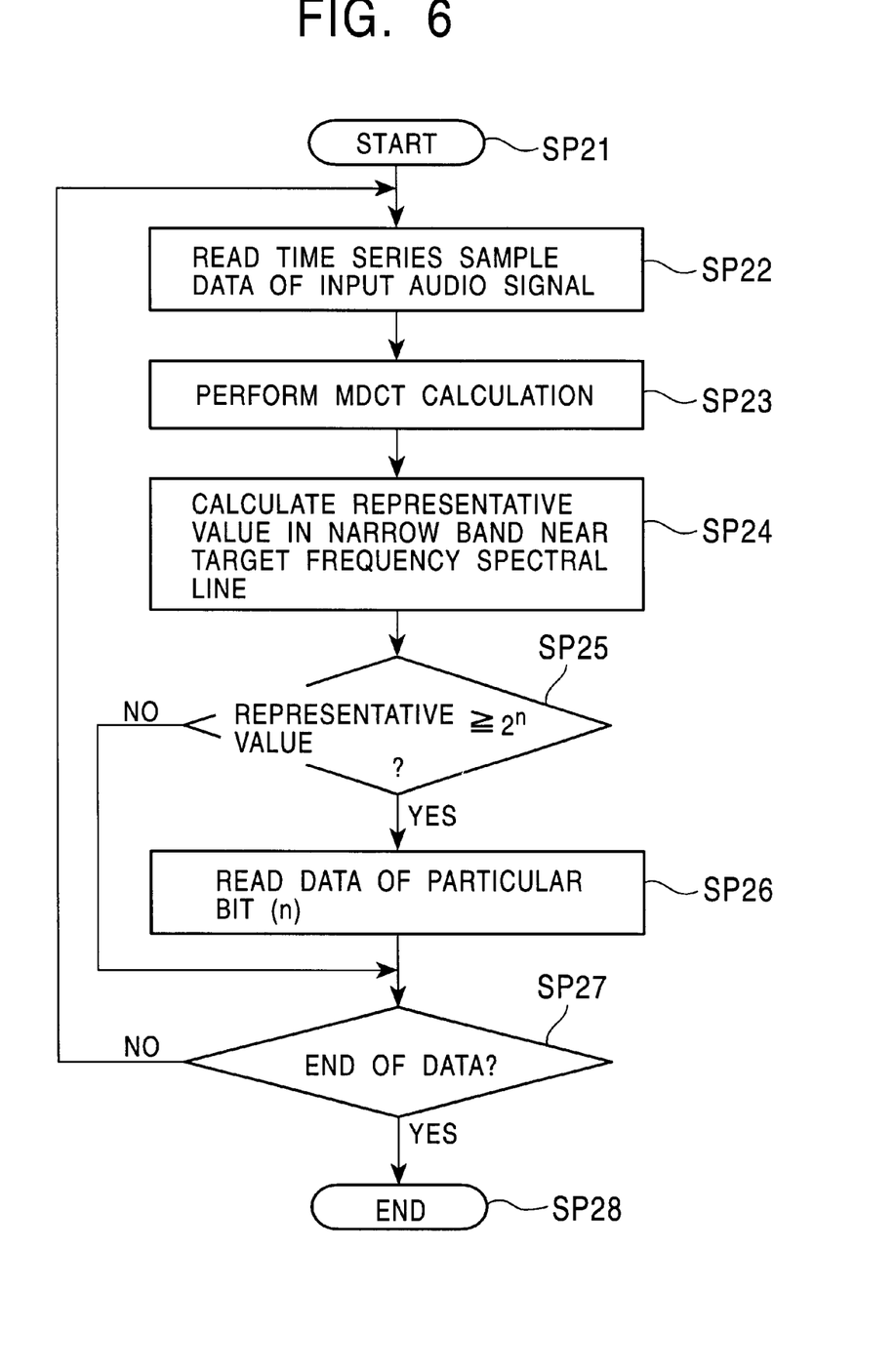
FIG. 6 is a flow chart for explaining processing of the watermark decoder of FIG. 5.

FIG. 6 is a flow chart showing a processing procedure of the watermark decoder 4. The watermark decoder 4 proceeds from step SP21 to step SP22 wherein it reads the digital audio signal DA3. Next, the watermark decoder 4 advances to step SP23 wherein it performs the MDCT calculation to obtain the frequency spectrum signal DS1.

The watermark decoder 4 then proceeds to step SP24 where it calculates the representative value P, and determines in step SP25 whether the representative value P is a predetermined value or greater. If the determination result is affirmative, then the watermark decoder 4 proceeds to step SP26 wherein it captures a predetermined bit of the representative value P before it advances to step SP27.

If the representative value P is smaller than the predetermined value, then the watermark decoder 4 proceeds from step SP25 directly to step SP27 without carrying out the processing of step SP26. The watermark decoder 4 determines whether the processing of the digital audio signal DA3 has been completed, and if a negative determination result is obtained, then the watermark decoder 4 returns to step SP22. Thus, the watermark decoder 4 repeats the processing procedure for each sample block, and if a sample block wherein the representative value P of the predetermined value or greater is obtained is encountered, then it reads a predetermined bit of the representative value P to reproduce the copyright data DC. If a determination result in step SP27 is affirmative, then the watermark decoder 4 advances from step SP27 to step SP28 where it terminates the processing procedure.

The operation of the embodiment having the configuration set forth above will now be described.

In a manufacturing process of an optical disk, the digital audio signal DA1 to be recorded in the optical disk is applied to the watermark encoder 2 (see FIG. 1), and converted into the frequency spectrum signal DS in succession by the MDCT calculating section 12.

The copyright data DC is embedded in the frequency spectrum signal converted from the digital audio signal DA1. This makes it possible to inhibit deterioration in sound quality and to embed the copyright data DC in such a manner that it is resistant to analysis, as compared with a case wherein this type of data is embedded directly into the digital audio signal DA1 or a PCM audio signal is operated by this type of data.

To be more specific, regarding the frequency spectrum signal, the squared sum of frequency spectral values is calculated in a narrow band that includes a target frequency spectral line, and a representative value is calculated that accurately represents a signal level of a particular frequency even when the phase of the digital audio signal DA1 changes.

At this time, if a sine wave of a single frequency undergoes MDCT, then energy is concentrated on a frequency spectral line of the frequency, a frequency spectral line immediately preceding the frequency spectral line, and two spectral lines immediately following the frequency spectral line. Hence, a frequency spectral value of a target frequency, a frequency spectral value immediately preceding the frequency spectral value of the target frequency, and two spectral values immediately following the frequency spectral value of the target frequency are selected. Then, based on the spectral values, a square of a sum of absolute spectral values of even-numbered ordinal positions and a square of a sum of absolute spectral values of odd-numbered ordinal positions are added, and a square root of the value obtained by the addition is calculated so as to obtain the representative value P of the target frequency spectrum.

Thus, embedding the copyright data in the digital audio signal DA1 by setting the representative value P makes it possible to detect the representative value by using a value substantially identical to the value set in the watermark encoder 2 even if the sampling phase of an audio signal changes when reproducing the copyright data DC.

As set forth above, in the digital audio signal DA1, a predetermined bit of the representative value P is set to a logical value associated with the copyright data DC to correct the representative value P, and four frequency spectral values supplied for calculating the representative value P are corrected on the basis of the corrected representative value P. Furthermore, a frequency spectrum signal based on the corrected frequency spectral value undergoes the inverse MDCT processing thereby to embed the copyright data DC in the digital audio signal DA1.

At this time, correcting the four frequency spectral values before embedding the copyright data DC enables the copyright data DC to be scattered in a narrow band at the time of embedding. This permits improved security and resistance to attacks, etc.

In addition, the copyright data DC is embedded only if the representative value P is a predetermined value or greater. This makes it possible to effectively inhibit deterioration in sound quality of the digital audio signal DA1 and to render the copyright data DC difficult to find.

Moreover, predetermined offset values are set in bits following the bit in which a logical value has been set by the copyright data DC so as to prevent the logical value based on the copyright data DC from being changed when addition or subtraction is implemented at least on the least significant bit. This makes it possible to properly reproduce the copyright data DC even if a sampling value of an audio signal is changed due to a quantization error when reproducing the copyright data.

Thus, the copyright data DC embedded in the digital audio signal DA1 as described above will be accurately dubbed regardless of whether it is dubbed in a digital signal format or an analog signal format.

Therefore, the copyright data DC superimposed on the digital audio signal DA1 can be verified when dubbing or by reproducing a dubbed source, thus permitting measures against various types of illegal copying to be taken.

The digital audio signals DA3 obtained from a variety of sources as previously described are converted into frequency spectrum signals in the MDCT calculating section 22 of the watermark decoder 4 shown in FIG. 5, and the representative value P thereof is calculated in the following representative value calculating section 24 in the same manner as in the case of the watermark encoder 2. Based on the calculated representative value P, a particular bit is extracted thereby to reproduce the copyright data DC.

According to the configuration set forth above, copyright data is embedded in frequency spectral data obtained by subjecting digital audio signals to the modified discrete cosine transform processing, which is one of orthogonal transforms, and then applying the inverse modified discrete cosine transform thereto. This makes it possible to inhibit deterioration in quality of digital audio signals and to superimpose copyright data or the like in such a manner that it will be difficult to find.

At this time, based on the representative value P, a predetermined bit of a spectral value of a predetermined frequency is indirectly set to a logical value associated with a logical value of copyright data when embedding input data in the frequency spectral data. In this way, copyright data can be embedded in such a manner that it will be difficult to find.

Moreover, input data is embedded so that a predetermined bit of the representative value P, which is a squared sum of a plurality of spectral values in the vicinity of a predetermined spectral line, takes a logical value corresponding to a logical value of copyright data. This enables the copyright data to be positively detected when detecting the copyright data even in a different sampling phase.

Security can be improved by correcting a plurality of spectral values, which have been supplied for calculating the representative value P, on the basis of the corrected representative value P.

In the representative value P, the logical value of the least significant bit is set so that the logical value based on copyright will not be changed by addition or subtraction carried on at least the least significant bit. This allows copyright data to be positively detected even if a sampling value is changed due to a quantization error.

In the embodiment set forth above, the case has been described wherein a representative value is calculated by obtaining a square root of a squared sum of the calculated from four spectral values; the present invention, however, is not limited thereto. Alternatively, a squared sum may be used as a representative value as long as it is adequate for practical use. In this case, the entire configuration can be simplified accordingly.

Furthermore, in the embodiment described above, the case has been described wherein, based on the four spectral values, a squared value of an absolute value sum of spectral values of even-numbered ordinal positions and a squared value of an absolute value sum of spectral values of odd-numbered ordinal positions are added to obtain a representative value; the present invention, however, is not limited thereto. As an alternative, a representative value may be calculated from a target frequency spectral value and an adjoining spectral value as long as accuracy that is sufficiently for practical use can be secured. When higher accuracy is required, four or more spectral values may be used to calculate a representative value.

In the embodiment above, the case has been described wherein frequency spectrum values are indirectly operated via a representative value to embed copyright data; the present invention, however, is not limited thereto. Alternatively, frequency spectral values may be directly bit-operated to embed copyright data.

Furthermore, in the embodiment set forth above, the case has been described wherein, when a representative value in one sample block is a predetermined value or more, one bit of copyright data is embedded in the sample block; however, the present invention is not limited thereto. A plurality of bits may be embedded in one sample block.

Furthermore, in the embodiment set forth above, the case wherein copyright data is embedded has been described;

however, the present invention is not limited thereto. The present invention finds a wide range of applications, including an application wherein diverse types of information are superimposed as necessary in transmission.

In the embodiment set forth above, the case has been described where digital audio signals are recorded in and reproduced from an optical disk; the invention, however, is not limited thereto. The invention can be extensively applied to many cases including one in which a variety of types of information are transmitted via the Internet.

Moreover, in the embodiment described above, the case has been described wherein digital audio signals are converted into frequency spectrum signals by the MDCT, which is one of orthogonal transforms, and conversely, the frequency spectrum signals are converted into digital audio signals by the inverse MDCT processing; the present invention, however, is not limited thereto. Alternatively, the present invention can be extensively applied, for example, to video signal processing based on a variety of types of orthogonal transform, including discrete cosine transform, Haar transform, etc.

Thus, the present invention makes it possible to provide a signal processing apparatus and a signal processing method that are able to prevent the quality of input signals from deteriorating and to superimpose copyright data or the like in such a manner that it will be difficult to be analyzed, by embedding input data in coefficient data obtained by applying orthogonal transform processing to input signals, then carrying out inverse orthogonal transform processing. The present invention also provides a recording medium wherein data has been recorded by the signal processing apparatus and the signal processing method described above.

What is claimed is:

1. A signal processing apparatus comprising:
    orthogonal transforming means for carrying out orthogonal transform processing on an input signal to generate coefficient data;
    input data processing means for embedding input data in said coefficient data by setting a predetermined bit of predetermined coefficient data to a logical value corresponding to a logical value of said input data, and for outputting a result; and
    inverse orthogonal transforming means for carrying out inverse orthogonal transform processing on output data of said input data processing means, and outputting a result.

2. A signal processing apparatus according to claim 1, wherein said input data processing means sets logical values of bits of lower order than said predetermined bit so that the logical value of said predetermined bit is not changed by addition or subtraction carried out on at least the least significant bit.

3. A signal processing apparatus according to claim 1, wherein;
    said input signal is an audio signal;
    said orthogonal transforming means is modified discrete cosine transform processing means for implementing modified discrete cosine transform processing on said input signal to generate said coefficient data based on frequency spectral data; and
    said inverse orthogonal transforming means is inverse modified discrete cosine transform processing means for implementing inverse modified discrete cosine transform processing on said coefficient data based on said frequency spectral data.

4. A signal processing apparatus according to claim 3, wherein said input data processing means embeds said input data in said frequency spectral data so that said predetermined bit has a logical value corresponding to a logical value of said input data in data of a squared sum of a plurality of spectral values in the vicinity of a predetermined frequency spectral line in said frequency spectral data.

5. A signal processing apparatus according to claim 3, wherein said input data processing means comprises:
    squared sum detecting means for detecting data of a squared sum of plural spectral values in the vicinity of a predetermined frequency spectral line in said frequency spectral data;
    bit operating means for generating correction data of a squared sum by setting said predetermined bit to a logical value corresponding to a logical value of said input data in the data of said squared sum; and
    spectral value correcting means for correcting said plural spectral values on the basis of said correction data of said squared sum.

6. A signal processing apparatus according to claim 3, wherein said input data processing means comprises:
    squared sum detecting means for detecting data of a squared sum of plural spectral values in the vicinity of a predetermined frequency spectral line in said frequency spectral data;
    bit operating means for setting, in the data of said squared sum, said predetermined bit to a logical value corresponding to a logical value of said input data and for setting logical values of bits of lower order than said predetermined bit so that the logical value of said predetermined bit is not changed by addition or subtraction carried out on at least the least significant bit, when generating said correction data of said squared sum; and
    spectral value correcting means for correcting said plural spectral values on the basis of said correction data of said square sum.

7. A recording medium in which a predetermined input signal has been recorded, wherein said input signal is subjected to orthogonal transform processing to generate coefficient data, input data is embedded in said coefficient data by setting a predetermined bit of predetermined coefficient data to a logical value corresponding to a logical value of said input data, then said coefficient is subjected to inverse orthogonal transform processing to be converted into said original input signal prior to recording.

8. A recording medium according to claim 7, wherein logical values of bits of lower order than said predetermined bit are set so that the logical value of said predetermined bit is not changed by addition or subtraction carried out on at least the least significant bit.

9. A recording medium according to claim 7, wherein;
    said input signal is an audio signal;
    said orthogonal transform processing is modified discrete cosine transform processing for implementing modified discrete cosine transform processing on said input signal to generate said coefficient data based on frequency spectral data; and
    said inverse orthogonal transform processing is inverse modified discrete cosine transform processing for implementing inverse modified discrete cosine transform processing on said coefficient data based on said frequency spectral data.

10. A recording medium according to claim 9, wherein said input data is embedded in said frequency spectral data so that said predetermined bit has a logical value corresponding to a logical value of said input data in data of a squared sum of plural spectral values in the vicinity of a predetermined frequency spectral line in said frequency spectral data.

11. A recording medium according to claim 9, wherein said input data is embedded in said frequency spectral data by the steps of:
   detecting data of a squared sum a plurality of spectral values in the vicinity of a predetermined frequency spectral line in said frequency spectral data;
   generating correction data of said squared sum by setting said predetermined bit to a logical value corresponding to a logical value of said input data in said data of said squared sum; and
   correcting said plural spectral values on the basis of said correction data of said squared sum.

12. A recording medium according to claim 9, wherein said input data is embedded in said frequency spectral data by the steps of:
   detecting data of a squared sum of plural spectral values in the vicinity of a predetermined frequency spectral line in said frequency spectral data;
   generating correction data of said squared sum by setting, in the data of said squared sum, said predetermined bit to a logical value corresponding to a logical value of said input data and also setting logical values of bits of lower order than said predetermined bit so that the logical value of said predetermined bit is not changed when addition or subtraction is carried out on at least the least significant bit; and
   correcting said plural spectral values on the basis of said correction data of said squared sum.

13. A signal processing apparatus comprising:
   orthogonal transforming means for implementing orthogonal transform processing on an input signal to generate coefficient data; and
   data reproducing means for reproducing embedded data, embedded in said input signal, from said coefficient data;
   wherein said embedded data is embedded in said input signal by setting a predetermined bit of predetermined coefficient data to a logical value corresponding to data to be embedded.

14. A signal processing apparatus according to claim 13, wherein said data reproducing means detects said predetermined bit of predetermined coefficient data in said coefficient data to reproduce said embedded data.

15. A signal processing apparatus according to claim 13, wherein;
   said input signal is an audio signal; and
   said orthogonal transform processing is modified discrete cosine transform processing for implementing modified discrete cosine transform processing on said input signal to generate said coefficient data based on frequency spectral data.

16. A signal processing apparatus according to claim 15, wherein said data reproducing means detects data of a squared sum of a plurality of spectral values in the vicinity of a predetermined frequency spectral line in said frequency spectral data, and detects said predetermined bit of the data of said squared sum to reproduce said data.

17. A signal processing method comprising the steps of;
   implementing orthogonal transform processing on an input signal to generate coefficient data; and
   embedding input data in said coefficient data and subjecting a combined result to inverse orthogonal transform processing, then outputting a result;
   wherein said embedding is includes setting a predetermined bit of predetermined coefficient data to a logical value corresponding to data to be embedded.

18. A signal processing method according to claim 17, wherein logical values of bits of lower order than said predetermined bit are set so that the logical value of said predetermined bit is not changed by addition or subtraction carried out on at least the least significant bit, so as to embed said input data in said coefficient data.

19. A signal processing method according to claim 17; wherein;
   said input signal is an audio signal;
   said orthogonal transform processing is modified discrete cosine transform processing for implementing modified discrete cosine transform processing on said input signal to generate said coefficient data based on frequency spectral data; and
   said inverse orthogonal transform processing is inverse modified discrete cosine transform processing for implementing inverse modified discrete cosine transform processing on said coefficient data based on said frequency spectral data.

20. A signal processing method according to claim 19, wherein said input data is embedded in said frequency spectral data so that said predetermined bit has a logical value corresponding to a logical value of said input data in data of a squared sum of a plurality of spectral values in the vicinity of a predetermined frequency spectral line in said frequency spectral data.

21. A signal processing method according to claim 19, wherein said input data is embedded in said frequency spectral data by the steps of:
   detecting data of a squared sum of a plurality of spectral values in the vicinity of a predetermined frequency spectral line in said frequency spectral data;
   generating correction data of said squared sum by setting said predetermined bit to a logical value corresponding to a logical value of said input data in the data of said squared sum; and
   correcting said plural spectral values on the basis of said correction data of said squared sum.

22. A signal processing method according to claim 19, wherein said input data is embedded in said frequency spectral data by the steps of:
   detecting data of a squared sum of a plurality of spectral values in the vicinity of a predetermined frequency spectral line in said frequency spectral data;
   generating correction data of said square sum by setting said predetermined bit to a logical value corresponding to a logical value of said input data in the data of said squared sum and also setting logical values of bits of lower order than said predetermined bit so that the logical value of said predetermined bit is not changed in the data of said squared sum when addition or subtraction is carried out on at least the least significant bit; and
   correcting said plural spectral values on the basis of said correction data of said squared sum.

23. A signal processing method comprising the steps of:
   implementing orthogonal transform processing on an input signal to generate coefficient data; and
   reproducing data embedded in said input signal from said coefficient data;
   wherein data is embedded in said input signal by setting a predetermined bit of predetermined coefficient data to a logical value corresponding to data to be embedded.

24. A signal processing method according to claim 23, wherein said predetermined bit of predetermined coefficient data in said coefficient data is detected so as to reproduce data embedded in said input signal.

25. A signal processing method according to claim 23, wherein;

said input signal is an audio signal; and said orthogonal transform processing is modified discrete cosine transform processing for implementing modified discrete cosine transform processing on said input signal to generate said coefficient data based on frequency spectral data.

26. A signal processing method according to claim 25, wherein data of a squared sum of a plural spectral values in the vicinity of a predetermined frequency spectral line in said frequency spectral data is detected to reproduce data embedded in said input signal.

* * * * *